US012017852B2

(12) United States Patent
Otto et al.

(10) Patent No.: US 12,017,852 B2
(45) Date of Patent: *Jun. 25, 2024

(54) GOODS-TO-MAN WAREHOUSING COMPRISING MULTILEVEL RACKING, MOBILE STORAGE UNITS, STORAGE UNIT TRANSPORTERS, AND PICK-PLACE VEHICLE

(71) Applicant: Crown Equipment Corporation, New Bremen, OH (US)

(72) Inventors: Matthew J. Otto, New Bremen, OH (US); Gregory S. Garmann, Maria Stein, OH (US); Mark E. Addison, Ludlow Falls, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,878

(22) Filed: May 5, 2023

(65) Prior Publication Data

US 2023/0271780 A1 Aug. 31, 2023

Related U.S. Application Data

(60) Continuation of application No. 17/375,121, filed on Jul. 14, 2021, now Pat. No. 11,673,745, which is a
(Continued)

(51) Int. Cl.
*B65G 1/04* (2006.01)
*B65G 1/10* (2006.01)
(Continued)

(52) U.S. Cl.
CPC ......... *B65G 1/0492* (2013.01); *B65G 1/0485* (2013.01); *B65G 1/10* (2013.01);
(Continued)

(58) Field of Classification Search
None
See application file for complete search history.

(56) References Cited

U.S. PATENT DOCUMENTS

| 3,111,313 | A | 11/1963 | Parks |
| 5,032,994 | A | 7/1991 | Wellman |
| (Continued) | | | |

FOREIGN PATENT DOCUMENTS

| DE | 102012016522 A1 | 3/2013 |
| EP | 1028074 A1 | 8/2000 |
| (Continued) | | |

OTHER PUBLICATIONS

Extended European Search Report dated May 30, 2023 pertaining to European Application No. 22194235.2 filed Jan. 13, 2017.
(Continued)

*Primary Examiner* — Mark C Hageman
(74) *Attorney, Agent, or Firm* — DINSMORE & SHOHL LLP

(57) ABSTRACT

A goods-to-man warehousing system comprises a multilevel racking system, a plurality of mobile storage units, a storage unit transporter, a pick-place vehicle, a mobile storage unit transfer node, and a warehouse management computing hub. The multilevel racking system comprises a vertically and horizontally distributed array of storage bays. One or more of the mobile storage units are positioned in respective ones of the storage bays of the multilevel racking system. The pick-place vehicle comprises pick-place hardware that enables the pick-place vehicle to transfer mobile storage units between a plurality of different, vertically displaced storage bays of the multilevel racking system and the mobile storage unit transfer node of the goods-to-man warehousing system. The storage unit transporter comprises storage unit engagement hardware that enables the storage unit transporter to transport mobile storage units to or from the mobile
(Continued)

storage unit transfer node of the goods-to-man warehousing system.

6 Claims, 11 Drawing Sheets

Related U.S. Application Data continuation of application No. 16/890,038, filed on Jun. 2, 2020, now Pat. No. 11,066,238, which is a continuation of application No. 16/426,576, filed on May 30, 2019, now Pat. No. 10,710,805, which is a division of application No. 15/405,886, filed on Jan. 13, 2017, now Pat. No. 10,351,346.

(60) Provisional application No. 62/278,502, filed on Jan. 14, 2016.

(51) Int. Cl.
*B65G 1/137* (2006.01)
*B66F 9/075* (2006.01)
*B66F 9/24* (2006.01)
*G06Q 10/087* (2023.01)

(52) U.S. Cl.
CPC .......... *B65G 1/1378* (2013.01); *B66F 9/0755* (2013.01); *B66F 9/24* (2013.01); *G06Q 10/087* (2013.01)

(56) References Cited

U.S. PATENT DOCUMENTS

| | | | |
|---|---|---|---|
| 6,602,037 B2 | 8/2003 | Winkler | |
| 7,894,933 B2 | 2/2011 | Mountz et al. | |
| 8,480,347 B2 | 7/2013 | Schfer | |
| 8,606,392 B2 | 12/2013 | Wurman et al. | |
| 9,519,284 B2 | 12/2016 | Wurman et al. | |
| 9,725,241 B2 | 8/2017 | Swinkels et al. | |
| 10,065,798 B2 | 9/2018 | Borders et al. | |
| 2013/0103552 A1 | 4/2013 | Hoffman et al. | |
| 2014/0178161 A1 | 6/2014 | Moosburger et al. | |
| 2015/0291356 A1 | 10/2015 | Oki et al. | |
| 2016/0129592 A1 | 5/2016 | Saboo et al. | |
| 2016/0145045 A1 | 5/2016 | Mountz et al. | |
| 2017/0203921 A1 | 7/2017 | Issing | |
| 2017/0267452 A1 | 9/2017 | Goren et al. | |
| 2018/0127212 A1 | 5/2018 | Jarvis et al. | |
| 2018/0305122 A1 | 10/2018 | Moulin et al. | |

FOREIGN PATENT DOCUMENTS

| | | |
|---|---|---|
| JP | S61217404 A | 9/1986 |
| JP | 03111313 A | 5/1991 |
| JP | 2003292116 A | 10/2003 |

OTHER PUBLICATIONS

Andrew Keith, "The ideal warehouse improvements in technology to come", Retail & Distribution Management, Sep. 1, 1989.

Krishan Rana, "Order Picking in Narrow-Aisle Warehouses", International Journal of Physical Distribution & Logistics Management, vol. 20, Issue 2, pp. 9-15, Jan. 1, 1990.

International Search Report and Written Opinion dated Apr. 19, 2017 pertaining to International Application No. PCT/US2017/013405.

Chinese Office Action dated Sep. 9, 2019 for Application No. 201780012882.5 filed Jan. 13, 2017.

Non-Final Office Action pertaining to corresponding U.S. Appl. No. 16/416,451, dated Dec. 26, 2019.

European Examination Report dated Sep. 2, 2019 for Application No. 17704114.2 filed Jan. 13, 2017.

GOODS-TO-MAN WAREHOUSING COMPRISING MULTILEVEL RACKING, MOBILE STORAGE UNITS, STORAGE UNIT TRANSPORTERS, AND PICK-PLACE VEHICLE

CROSS-REFERENCE TO RELATED APPLICATIONS

This application is a continuation of U.S. patent application Ser. No. 17/375,121 filed Jul. 14, 2021, which is a continuation of U.S. patent application Ser. No. 16/890,038 filed Jun. 2, 2020, which is continuation of U.S. patent application Ser. No. 16/426,576 filed May 30, 2019, which is a divisional of U.S. patent application Ser. No. 15/405,886 filed Jan. 13, 2017, which claims the benefit of U.S. Provisional Application Ser. No. 62/278,502 filed Jan. 14, 2016, the entire disclosure of which is hereby incorporated herein by reference.

BACKGROUND

The present disclosure relates to automatic retrieval and placement of goods in warehouses and, more particularly to goods-to-man warehousing systems.

BRIEF SUMMARY

The present applicant has recognized that goods-to-man warehousing systems, where partially or fully autonomous storage unit transporters move stocked items to and from goods receiving stations, often fail to utilize available warehouse space efficiently More specifically, many goods-to-man automated warehouse inventory systems are limited to floor level operation and do not take advantage of multilevel racking systems.

According to the subject matter of the present disclosure, a storage unit transporter and a pick-place vehicle provide goods-to-man service to a vertically and horizontally distributed array of storage bays. In this manner, multiple levels of storage bays, including those closer to the warehouse ceiling can be utilized for storage to make more use of existing warehouse space. Rather than transporting mobile storage units exclusively to floor-level locations, a storage unit transporter can coordinate with a pick-place vehicle to provide automated or semi-automated access to storage bays not directly accessible to the storage unit transporter.

In accordance with one embodiment of the present disclosure, a goods-to-man warehousing system comprises a multilevel racking system, a plurality of mobile storage units, a storage unit transporter, a pick-place vehicle, a mobile storage unit transfer node, and a warehouse management computing hub. The multilevel racking system comprises a vertically and horizontally distributed array of storage bays. One or more of the mobile storage units are positioned in respective ones of the storage bays of the multilevel racking system. The pick-place vehicle comprises pick-place hardware that enables the pick-place vehicle to transfer mobile storage units between a plurality of different, vertically displaced storage bays of the multilevel racking system and the mobile storage unit transfer node of the goods-to-man warehousing system. The storage unit transporter comprises storage unit engagement hardware that enables the storage unit transporter to transport mobile storage units to or from the mobile storage unit transfer node of the goods-to-man warehousing system. The warehouse management computing hub is programmed to instruct the storage unit transporter and the pick-place vehicle to coordinate movement of the mobile storage units in the goods-to-man warehousing system.

In accordance with another embodiment of the present disclosure, a goods-to-man warehousing system comprises a multilevel racking system comprising a plurality of racking system aisles between adjacent arrays of storage bays, a storage unit transporter configured to travel in the racking system aisles, a plurality of mobile storage units, a pick-place vehicle configured to travel in the racking system aisles, a mobile storage unit transfer node, a goods receiving station, and a warehouse management computing hub. The multilevel racking system comprises a vertically and horizontally distributed array of storage bays. One or more of the mobile storage units are positioned in respective ones of the storage bays of the multilevel racking system. Each of the mobile storage units is structurally configured to permit the storage unit transporter to enter and exit a lifting zone beneath the mobile storage unit in at least two orthogonal directions, with the lifting surface of the storage unit transporter at the traveling height. The pick-place vehicle comprises lifting forks mounted to a pivoting mast enabling the pick-place vehicle to transfer mobile storage units between a plurality of different, vertically displaced storage bays of the multilevel racking system and the mobile storage unit transfer node of the goods-to-man warehousing system. The storage unit transporter comprises storage unit engagement hardware that enables the storage unit transporter to transport mobile storage units from the mobile storage unit transfer node to the goods receiving station of the goods-to-man warehousing system. The storage unit transporter comprises a lifting surface and is structurally configured to lift a mobile storage unit off of a warehouse floor upon which the multilevel racking system is supported by elevating the transporter lifting surface from a traveling height to a transporting height. The warehouse management computing hub is programmed to coordinate transfer of the mobile storage units between the storage bays of the multilevel racking system, the mobile storage unit transfer node, the storage unit transporter, the goods receiving station, or combinations thereof.

In accordance with yet another embodiment of the present disclosure, a method of transporting of goods in a multilevel racking system comprises coordinating, via a warehouse management computing hub, transfer of mobile storage units between storage bays of the multilevel racking system, a mobile storage unit transfer node, and a storage unit transporter. The multilevel racking system comprises a vertically and horizontally distributed array of storage bays. One or more of the mobile storage units are positioned in respective ones of the storage bays of the multilevel racking system. The method further comprises transmitting, via the warehouse management computing hub, instructions to the storage unit transporter and a pick-place vehicle. The method also comprises transferring, via the pick-place vehicle, the mobile storage units between a plurality of different, vertically displaced storage bays of the multilevel racking system and the mobile storage unit transfer node. The method further still comprises transporting, via the storage unit transporter, the mobile storage units to or from the mobile storage unit transfer node of the goods-to-man warehousing system.

Although the concepts of the present disclosure are described herein with primary reference to particular types of multilevel racking systems, mobile storage units, storage unit transporters, pick-place vehicles, mobile storage unit transfer nodes, goods receiving stations, and warehouse management computing hubs, it is contemplated that the concepts will enjoy applicability to any form of multilevel racking systems, mobile storage units, storage unit transporters, pick-place vehicles, mobile storage unit transfer nodes, goods receiving stations, and warehouse management computing hubs.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
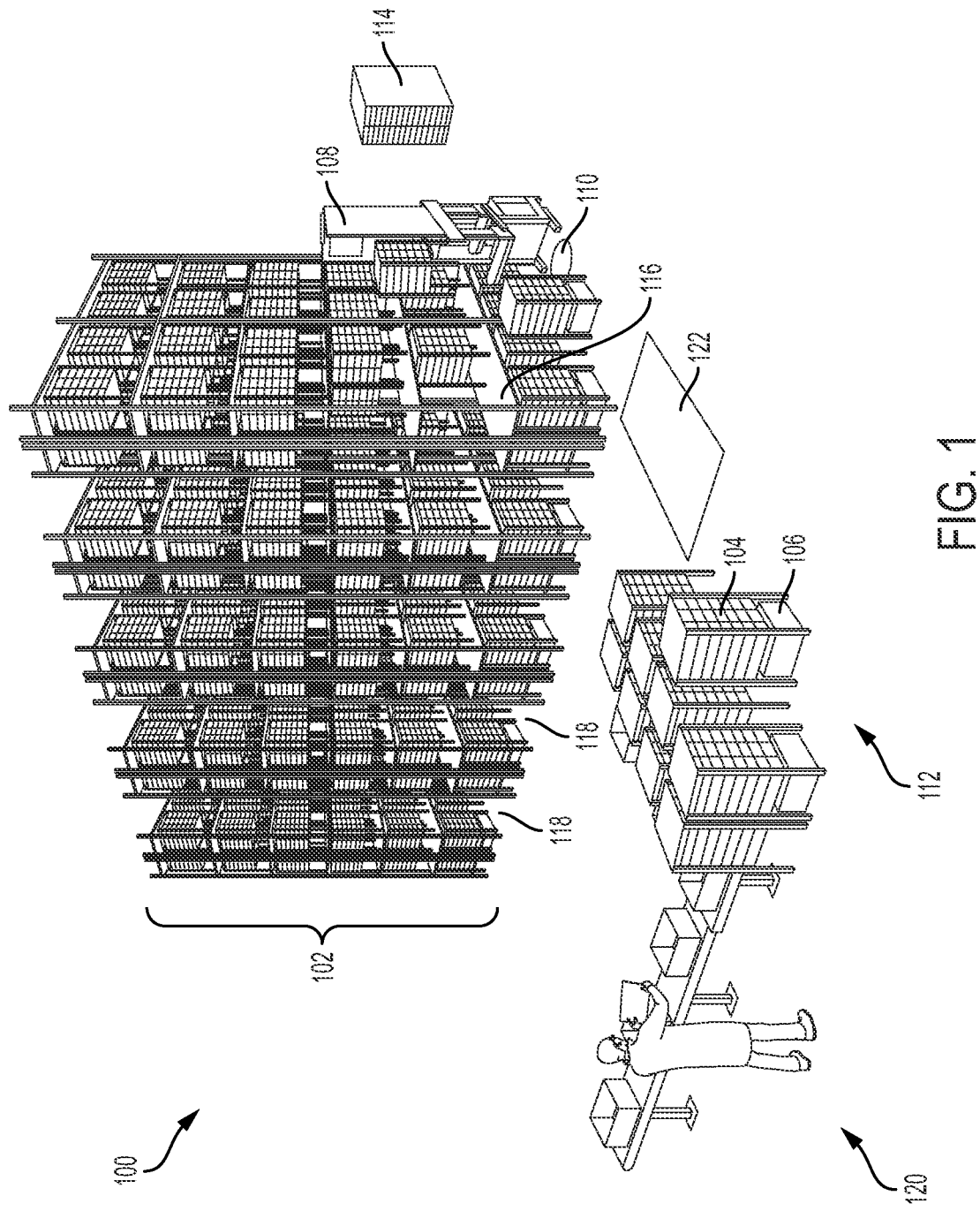
FIG. 1 depicts a goods-to-man warehousing system according to one or more embodiments shown and described herein.

Referring initially to FIG. 1, a goods-to-man warehousing system 100 is shown. The goods-to-man warehousing system 100 comprises a multilevel racking system 102, a plurality of mobile storage units 104, one or more storage unit transporters 106, one or more pick-place vehicles 108, one or more mobile storage unit transfer nodes 110, one or more goods receiving stations 112, and one or more warehouse management computing hubs 114. The multilevel racking system 102 comprises one or more vertically and horizontally distributed arrays of storage bays 116. The mobile storage units 104 can be positioned in respective ones of the storage bays 116 of the multilevel racking system 102.

It is contemplated that the mobile storage units 104 may be presented as a stacked pallet of similar goods or as a multilevel storage unit 104 with individual container bays that are configured to accommodate a plurality of different types of goods. In the particular embodiment illustrated in FIG. 1, the mobile storage units 104 comprise self-contained shelving units that are structurally configured to be positioned in the vertically and horizontally distributed storage bays 116 of the multilevel racking system 102. In this embodiment, the mobile storage units 104 are structurally configured to stand on a warehouse floor while permitting transporter travel there beneath. In this context, it is contemplated that the warehouse floor upon which the multilevel racking system 102 is supported may also function as the lowest level of the multilevel racking system 102 and will typically comprise a storage height that is sufficient to accommodate the height of the self-contained shelving unit. It is also contemplated that at least some of the mobile storage unit transfer nodes 110 may reside in the lowest level of the multilevel racking system 102 because the warehouse floor also functions as the lowest racking level in these areas. This allows for high velocity items to be placed on the ground level and be picked up by a storage unit transporter 106 without further involvement of the pick-place vehicle.

Respective storage bay heights may be limited to accommodate a height of only one mobile storage unit 104 to optimize usage of vertical warehouse space. Each storage bay 116 contains two mobile storage units 104, but this may vary in other embodiments. The multilevel racking system 102 may include a plurality of racking system aisles 118 between adjacent arrays of storage bays 116 and the storage unit transporter 106 and the pick-place vehicle 108 may be configured to travel in the racking system aisles 118. In some embodiments the aisle width of the racking system aisles 118 is less than approximately 2 meters. In other embodiments the aisle width of the racking system aisles is between approximately 1.2 m and approximately 1.8 m.

The pick-place vehicle 108 may comprise any type of conventional or yet-to-be developed vehicle capable of placing mobile storage units 104 in the multilevel racking system 102 or picking mobile storage units from the multilevel racking system 102. For example, referring to FIG. 1, in one embodiment of the present disclosure, the pick-place vehicle comprises a turret stock picker forklift comprising lifting forks mounted to a pivoting mast or a non-pivoting mast.

The pick-place vehicle 108 may be a manually operated vehicle, or a partially or fully autonomous vehicle. For example, and not by way of limitation, the pick-place vehicle 108 may comprise a barcode scanner to facilitate navigation with the aid of a plurality of navigational barcodes distributed throughout the racking system aisles 118. The warehouse management computing hub 114 and the pick-place vehicle 108 may be collectively configured for vehicle navigation within the racking system aisles 118 utilizing, at least in part, the barcode scanner and the navigational barcodes.

It is contemplated that a variety of alternative technologies may be provided to facilitate partial or fully autonomous navigation of the pick-place vehicle 108, including conventional, or yet-to-be developed technology. For example, and not by way of limitation, radio frequency identification (RFID) tags may be embedded in the warehouse floor, or secured to various warehouse objects, to help facilitate partially or fully autonomous navigation. Wire guidance systems, which are well documented in the art, may also be employed to help facilitate partially or fully autonomous navigation. In one contemplated embodiment, RFID tags embedded in the warehouse floor may be used in conjunction with a wire guidance system. In which case, it may be advantageous to embed the RFID tags at vehicle stop locations, pick-place locations, transfer node locations, or other significant navigational markers along a warehouse aisle. Partially or fully autonomous navigation may also be implemented, by way of non-limiting examples, through laser-based navigation, time of flight cameras, environmental based location, overhead feature-based localization, illumination-invariant feature detection, map partitioning, pre-positioned object-based localization, and/or transversal edge detection based localization.

The pick-place vehicle 108 comprises pick-place hardware that enables the pick-place vehicle to transfer mobile storage units 104 between a plurality of different, vertically displaced storage bays 116 of the multilevel racking system 102 and storage unit transfer nodes of the goods-to-man warehousing system 100. It is contemplated that the pick-place vehicle 108 may comprise any of a variety of forklift configurations, including, but not limited to, the TSP Series very narrow aisle trucks, reach trucks, and order pickers available from Crown Equipment Corporation. It is also contemplated that the present disclosure is not limited to the use of pick place-vehicles 108 including forks. The pick-place vehicle 108 may include any mechanical means for picking and placing the mobile storage units of the present disclosure, so long as the pick-place vehicle 108 is capable of accessing the storage bays 116 of a multilevel racking system 102 comprising a vertically and horizontally distributed array of storage bays 116.

The storage unit transporter 106 comprises storage unit engagement hardware that enables the storage unit transporter 106 to transport mobile storage units 104 from one or more mobile storage unit transfer nodes 110 to one or more goods receiving stations 112 of the goods-to-man warehousing system 100. For example, the storage unit transporter 106 may feature a lifting surface and be structurally configured to lift a mobile storage unit 104 off of a warehouse floor upon which the multilevel racking system 102 is supported by elevating the transporter lifting surface from a traveling height to a transporting height. Each of the mobile storage units 104 may be structurally configured to permit the storage unit transporter 106 to enter and exit a lifting zone beneath the mobile storage unit 104 in at least two orthogonal directions, with the lifting surface of the storage unit transporter 106 at the traveling height. The travel path beneath the multilevel racking system 102 is a linear travel path extending along the warehouse floor, in a storage plane defined by the distributed array of storage bays 116. The multilevel racking system may comprise a plurality of racking system aisles 118 between adjacent arrays of storage bays 116, where the storage unit transporter 106 may be further configured to transport the mobile storage unit 104 within, into, and out of the racking system aisles 118. The mobile storage units 104 may be positioned in vertically and horizontally distributed storage bays 116 of the multilevel racking system 102. Further, the mobile storage units 104 may be structurally configured for transporter travel there beneath by, for example, ensuring that a bottom surface of a lowest storage level of each of the mobile storage units 104 has a height exceeding the traveling height of the transporter lifting surface of the storage unit transporter 106.

In FIG. 1, the goods receiving station 112 comprises a goods selection terminal 120 that is outfitted for removal of goods from the mobile storage units 104. In an alternative embodiment, the goods-to-man warehousing system 100 further comprises an intermediate transfer station 112 that is positioned along a mobile storage unit travel path extending from the mobile storage unit transfer node 110 to the goods receiving station 112. The mobile storage units 104 may be positioned at the intermediate transfer station 122 and the goods-to-man warehousing system 100 may further comprise a tugger or other type of storage unit transfer vehicle outfitted to transfer one or more mobile storage units 104 from the goods receiving station 112 at the intermediate transfer station 122 to the goods selection terminal 120.

For example, and not by way of limitation, the mobile storage units 104 may be positioned on linked or unlinked towable units and the storage unit transfer vehicle may comprise a rider tow tractor or other type of tugger, such as the TR Series heavy-duty rider tow tractor available from Crown Equipment Corporation, as described in detail in the Operator Manual for Crown TR Series 4500 rider tow tractor. The storage unit transfer vehicle may be controlled by an operator located within or outside of the storage unit transfer vehicle. It is contemplated that the present disclosure is not limited to the use of a rider tow tractor. The storage unit transfer vehicle may include any mechanical means for transferring the mobile storage units of the present disclosure, so long as the storage unit transfer vehicle is capable of transferring one or more mobile storage units 104 from the goods receiving station at the intermediate transfer station 122 to the goods selection terminal 120.

The warehouse management computing hub 114 may be programmed to instruct the storage unit transporter 106 and the pick-place vehicle 108 to coordinate movement of the mobile storage units 104 in the goods-to-man warehousing system 100. The warehouse management computing hub 114 may be configured to manage locations of the plurality of mobile storage units 104, the storage unit transporters 106, the pick-place vehicles 108, the mobile storage unit transfer nodes 110, and the goods receiving stations 112. More specifically, the aforementioned coordinated movement may apply to the transfer of the mobile storage units 104 between the storage bays 116 of the multilevel racking system 102, the mobile storage unit transfer node 110, the storage unit transporter 106, the goods receiving station 112, or various combinations thereof. In addition, it is contemplated that these instructions may be presented in a variety of forms. For example, and not by way of limitation, these instructions may represent detailed turn-by-turn movements for the storage unit transporter 106 and pick-place vehicle 108 to accomplish the aforementioned coordination. Or, the instructions may merely represent a set of position and time coordinates necessary to accomplish the aforementioned coordination. In which case, the storage unit transporter 106 and pick-place vehicle 108 would be responsible for developing their own turn-by-turn travel paths to accomplish the aforementioned coordination. In any case, it is contemplated that those practicing the concepts of the present disclosure may rely on conventional or yet-to-be developed teachings related to warehouse traffic management and automated vehicle guidance to achieve the aforementioned coordination.

In another embodiment, it is contemplated that the pick-place vehicle 108 may transfer mobile storage units 104 between the storage bays 116 of the multilevel racking system 102 and the storage unit transporter 106. In this embodiment, the location of the storage unit transfer node 110 would correspond to the location of the storage unit transporter 106.

Figure 2:
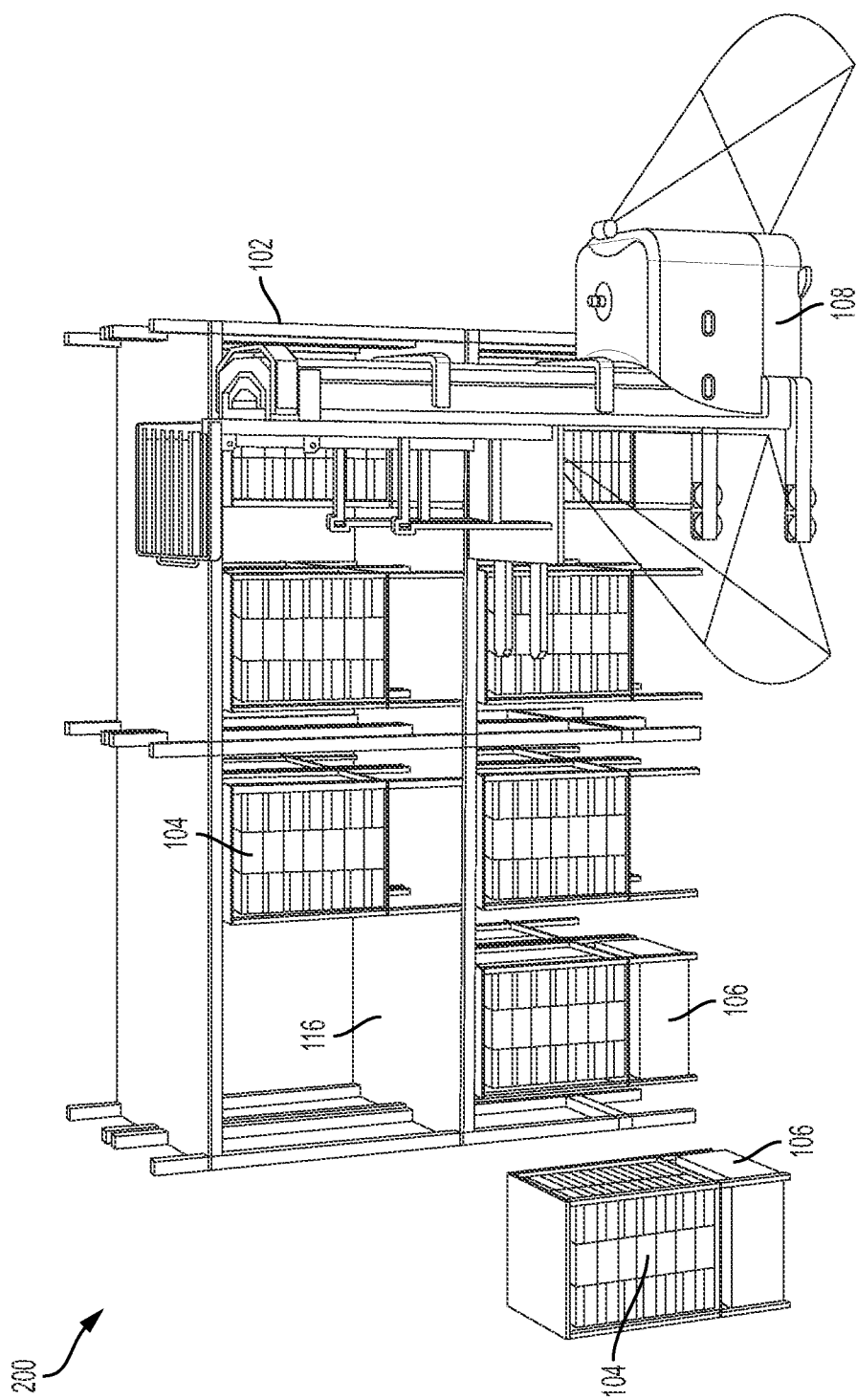
FIG. 2 depicts a moving pick-place vehicle and a storage unit transporter transporting a mobile storage unit in an aisle of a multilevel racking system according to one or more embodiments shown and described herein.

FIG. 2 is a side view depiction 200 of a pick-place vehicle 108 navigating an aisle 118. In the same aisle, a storage unit transporter 106 transports a mobile storage unit 104. Another storage unit transporter 106 navigates along the floor beneath a row of mobile storage units 104. In this example, a storage unit transporter 106 can travel outside of an aisle 118, which can help keep the aisle clear as well as reduce the travel time of transports 106 and/or pick-place vehicles 108.

Figure 3:
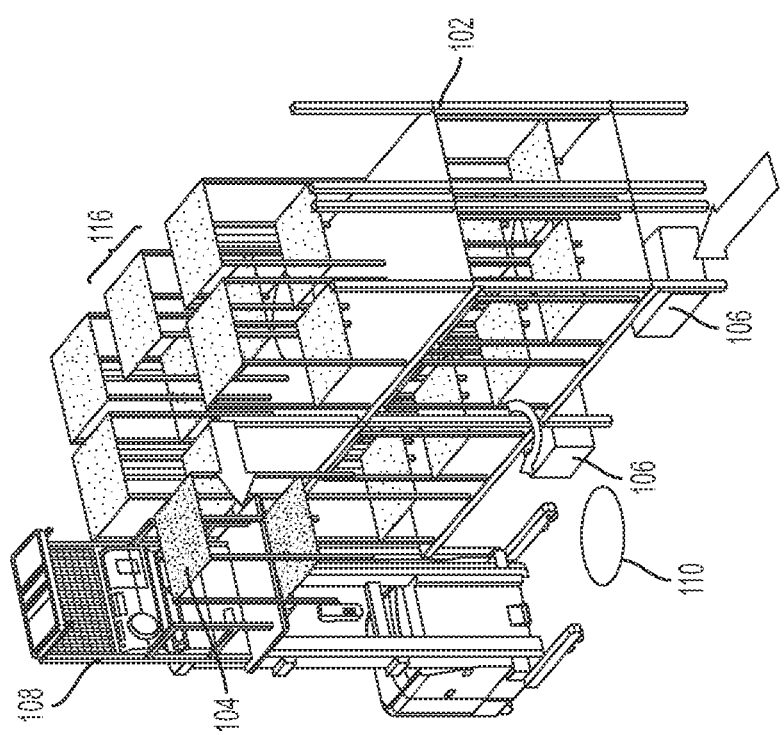
FIG. 3 depicts a pick-place vehicle retrieving a mobile storage unit from an upper level storage bay in a multilevel racking system according to one or more embodiments shown and described herein.

FIG. 3 is a depiction 300 of a pick operation. More specifically, a warehouse management computing hub and the pick-place vehicle 108 may be collectively configured to execute a pick operation by selecting a vertically displaced stocked storage bay 116 that is not accessible by the storage unit transporter 106 and has at least one target mobile storage unit 104. Retrieval of the target mobile storage unit 104 from the vertically displaced stocked storage bay 116 may be performed by engaging the target mobile unit 104 with a lifting mechanism of the pick-place vehicle 108. The lifting mechanism has been simplified in the figures for purposes of illustration. While a narrow aisle lift, such as a TSP, may be best suited for high density warehouses with narrow aisles, any of a variety of lifting mechanisms can be employed.

The pick-place vehicle 108 retrieves a target mobile storage unit 104 from the vertically displaced stocked storage bay 116. A storage unit transporter 106 approaches the pick-place vehicle 108 and a mobile storage unit transfer node 110 in the aisle 118 near the mobile storage unit 104 being retrieved by the pick-place vehicle 108. The mobile storage unit transfer node 110 may be vertically aligned with the stocked storage bay 116, at an end of an aisle 118 in which the stocked storage bay 116 resides, at a location within the aisle 118 in which the stocked storage bay 116 resides that is neither vertically aligned with the stocked storage bay 116 nor at an end of the aisle 118, or at a location outside of the aisle 118 in which the stocked storage bay 116 resides.

Figure 4:
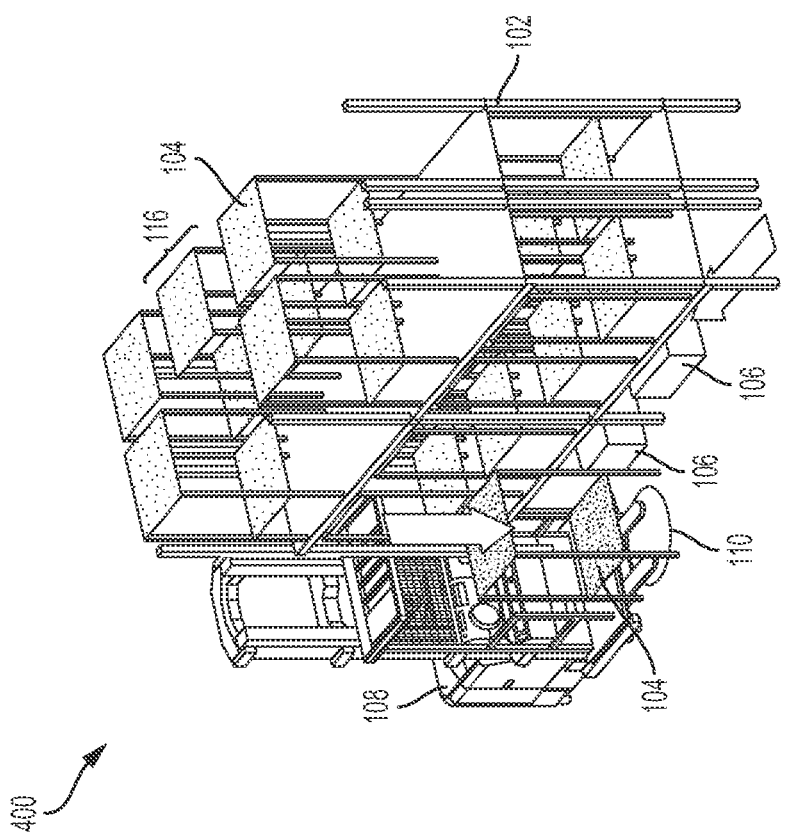
FIG. 4 depicts a pick-place vehicle lowering a mobile storage unit onto a mobile storage unit transfer node according to one or more embodiments shown and described herein.
Figure 5:
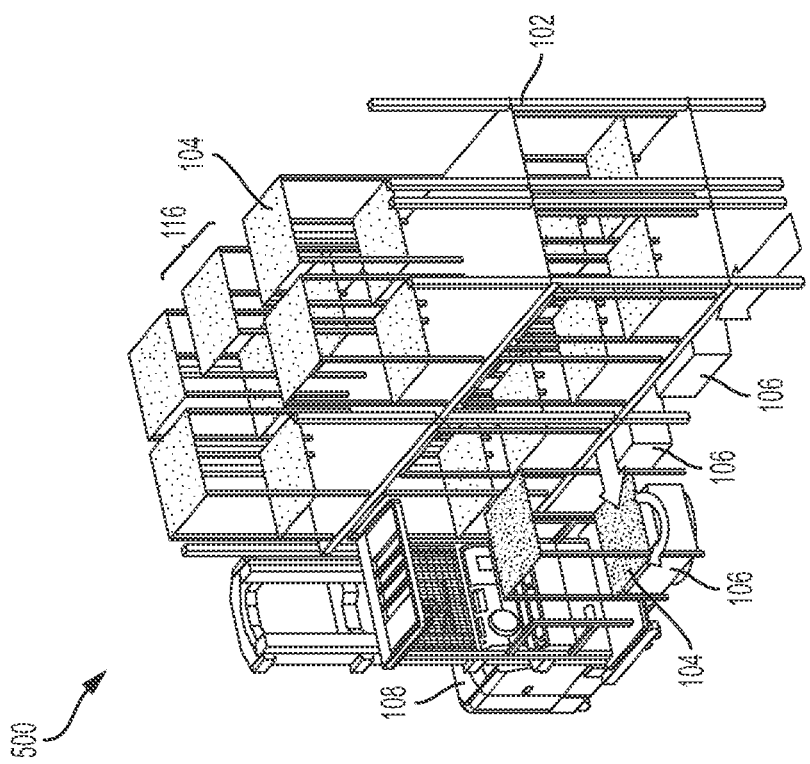
FIG. 5 depicts a storage unit transporter retrieving a mobile storage unit from a mobile storage unit transfer node according to one or more embodiments shown and described herein.
Figure 6:
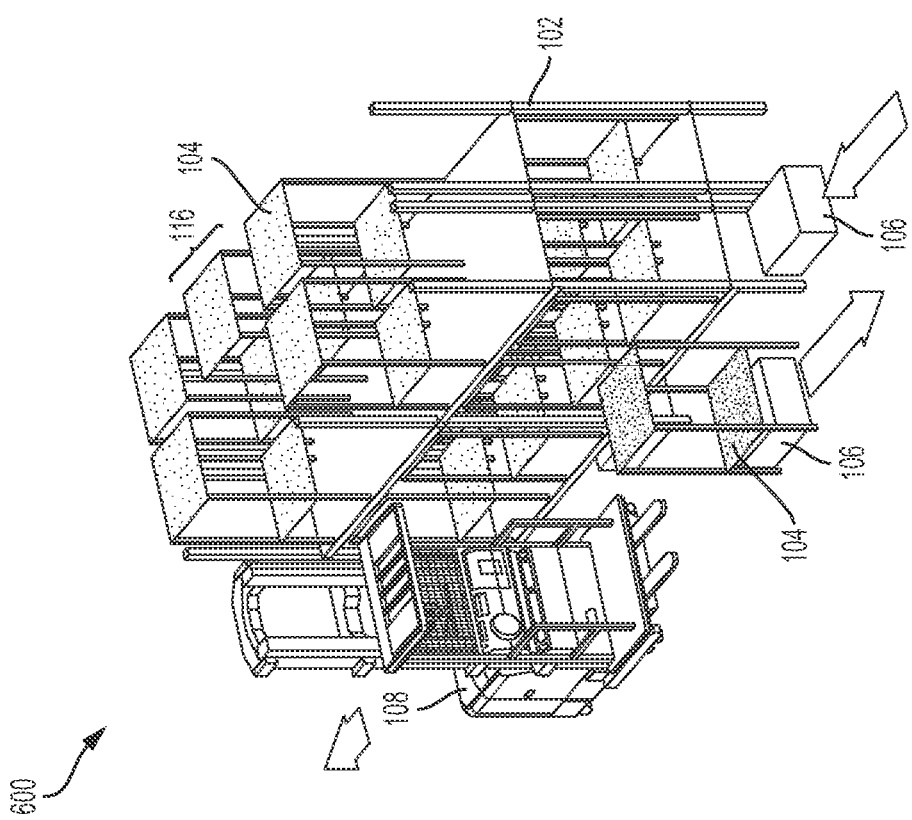
FIG. 6 depicts a pick-place vehicle and a storage unit transporter transporting a mobile storage unit moving in divergent directions according to one or more embodiments shown and described herein.

FIGS. 4, 5, and 6 present continuing depictions 400, 500, and 600 of the pick operation in FIG. 3. The pick-place vehicle 108 lowers the mobile storage unit 104 from the stocked storage bay 116 onto the mobile storage unit transfer node 110. The storage unit transporters 106 gets closer to the pick-place vehicle 108 and rotates toward the mobile storage unit transfer node 110.

Turning to FIGS. 5 and 6, the storage unit transporter 106 arrives at the mobile storage unit transfer node 110 under the mobile storage unit 104 and carries the mobile storage unit 104 away in a suitable direction. Examples of storage unit transporters are shown and described in more detail, for example, in U.S. Patent Application Publication US 2008/0166217 A1.

Figure 7:
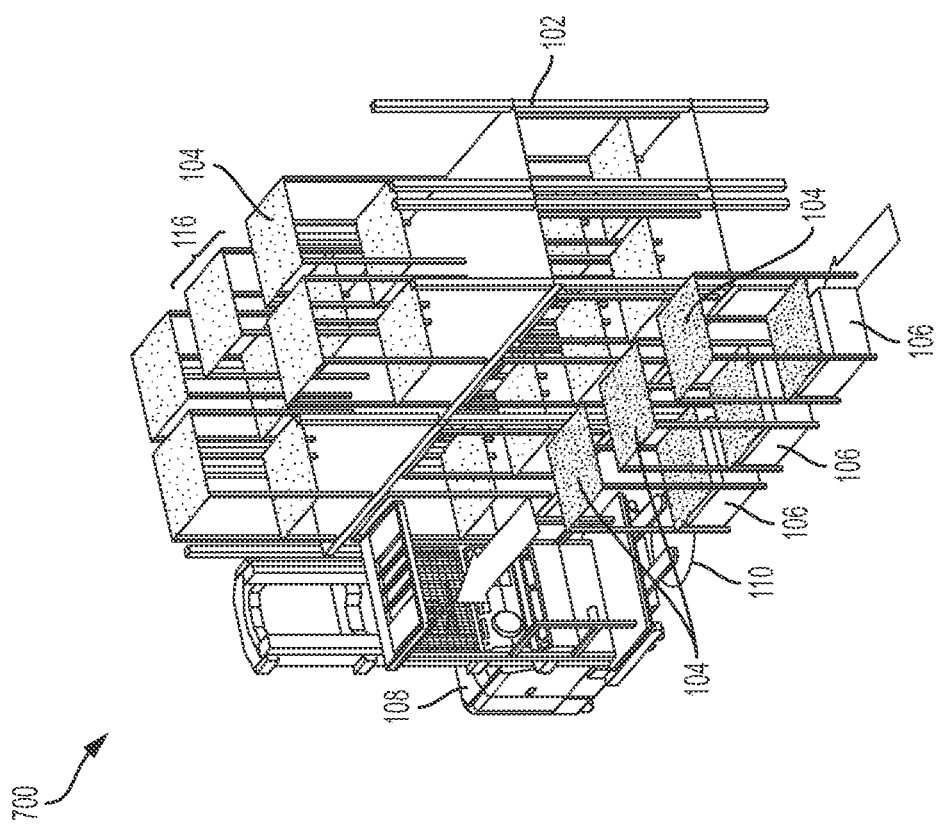
FIG. 7 depicts a plurality of storage unit transporters bringing respective mobile storage units towards a mobile storage unit transfer node in front of a pick-place vehicle according to one or more embodiments shown and described herein.

FIG. 7 is a depiction 700 of a place operation. More specifically, a warehouse management computing hub and the pick-place vehicle 108 may be collectively configured to execute a place operation comprising selection of a mobile storage unit transfer node 110 that is accessible by a storage unit transporter 106 and the pick-place vehicle 108, retrieval of a target mobile storage unit 104 from the mobile storage unit transfer node 110 by engaging the target mobile storage unit 104 with a lifting mechanism of the pick-place vehicle 108, and placement of the target mobile storage unit 104 into a vertically displaced unstocked or partially stocked storage bay 116 using the lifting mechanism of the pick-place vehicle 108. The place operation may further select the vertically displaced unstocked or partially stocked storage bay 116 based at least partially on a utilization frequency associated with the target mobile storage unit 104. The place operation may designate relatively high velocity storage bays 116 for target mobile storage units 104 with relatively high utilization frequencies and relatively low velocity storage bays 116 for target mobile storage units 104 of relatively low utilization frequencies. In some embodiments, the relatively high velocity storage bays of a warehouse aisle 118 are positioned closer to an end of the warehouse aisle 118 than the relatively low velocity storage bays 116, closer to a floor level of the warehouse aisle 118 than relatively low velocity storage bays 116, or both. In other embodiments, the relatively high velocity storage bays 116 of a warehouse aisle 118 are positioned at the ends of the warehouse aisle 118, at the floor level of the warehouse aisle 118, or both.

The velocity of storage bays 116 may be determined by the travel time needed for a storage unit transporter 106 and/or the pick-place vehicle 108 to drive to storage bay 116 and for the pick-place vehicle 108 to raise/lower with respect to the height of the storage bay 116. For example, a storage bay 116 may have a high velocity when it is located at the end of an aisle 118 closest to the goods receiving station 112, goods selection terminal 120, or intermediate transfer station 122, thus requiring less travel for the storage unit transporter 106 and/or the pick-place vehicle 108. Similarly, a storage bay 116 may have a high velocity when it is located at a height that is closer to floor level, thus requiring less access time for the pick-place vehicle 108 to raise and/or lower a mobile storage unit 104 into and/or out of the storage bay 116. A storage bay 116 may have an intermediate velocity when it is located in the middle of an aisle 118, because this requires a medium amount of travel for the storage unit transporter 106 and/or the pick-place vehicle 108. However, such a storage bay 116 may be deemed either a high or low velocity storage bay 116 relative to the locations of particular goods receiving stations 112, goods selection terminals 120, or intermediate transfer stations 122. In some embodiments, being located in the middle of an aisle 118 will result in a low velocity rating. A storage bay 116 may also have an intermediate velocity when it is located at a medium height, thus requiring a medium amount of access time for the pick-place vehicle 108 to raise and/or lower a mobile storage unit 104 into and/or out of the storage bay 116. A storage bay 116 may have a low velocity when it is located at the end of an aisle 118 furthest from the goods receiving station 112, goods selection terminal 120, or intermediate transfer station 122, thus requiring more travel for the storage unit transporter 106 and/or the pick-place vehicle 108. Similarly, a storage bay 116 may have a low velocity when it is located furthest from floor level, such as the highest levels, thus requiring the greatest amount of access time for the pick-place vehicle 108 to raise and/or lower a mobile storage unit 104 into and/or out of the storage bay 116.

Continuing with the depiction 700 of FIG. 7, a pick-place vehicle 108 arrives at a mobile storage unit transfer node 110. Multiple storage unit transporters 106, each carrying a mobile storage unit 104, approach the pick-place vehicle 108, with the first storage unit transporter 106 assigned to the mobile storage unit transfer node 110.

Figure 8:
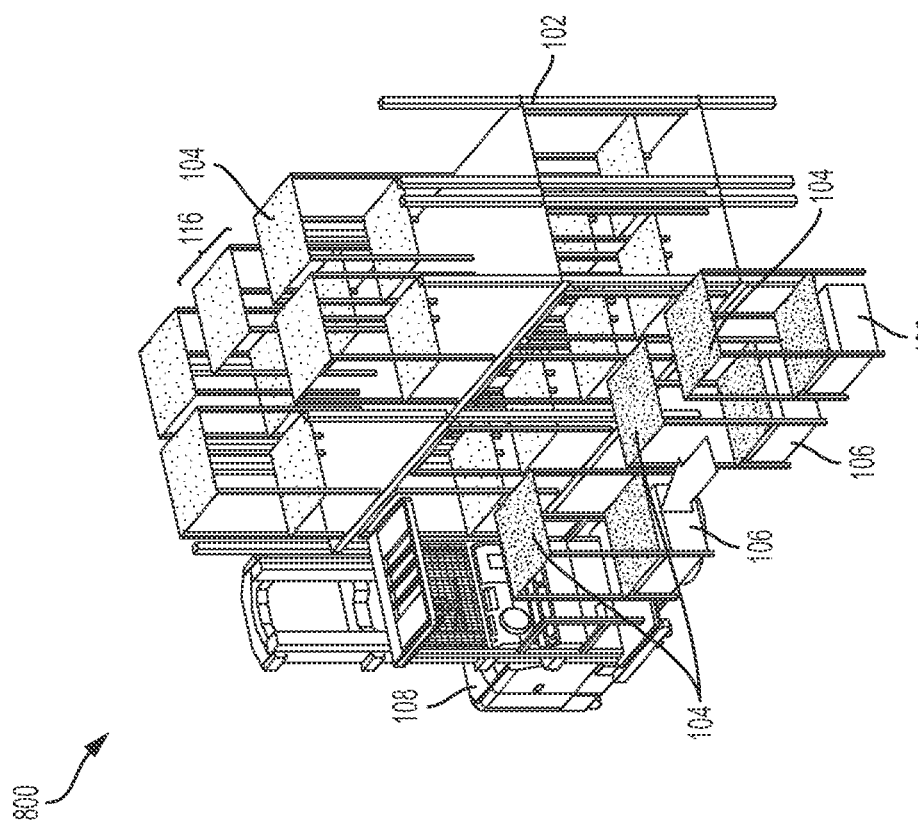
FIG. 8 depicts a storage unit transporter dropping off a mobile storage unit at a mobile storage unit transfer node according to one or more embodiments shown and described herein.
Figure 9:
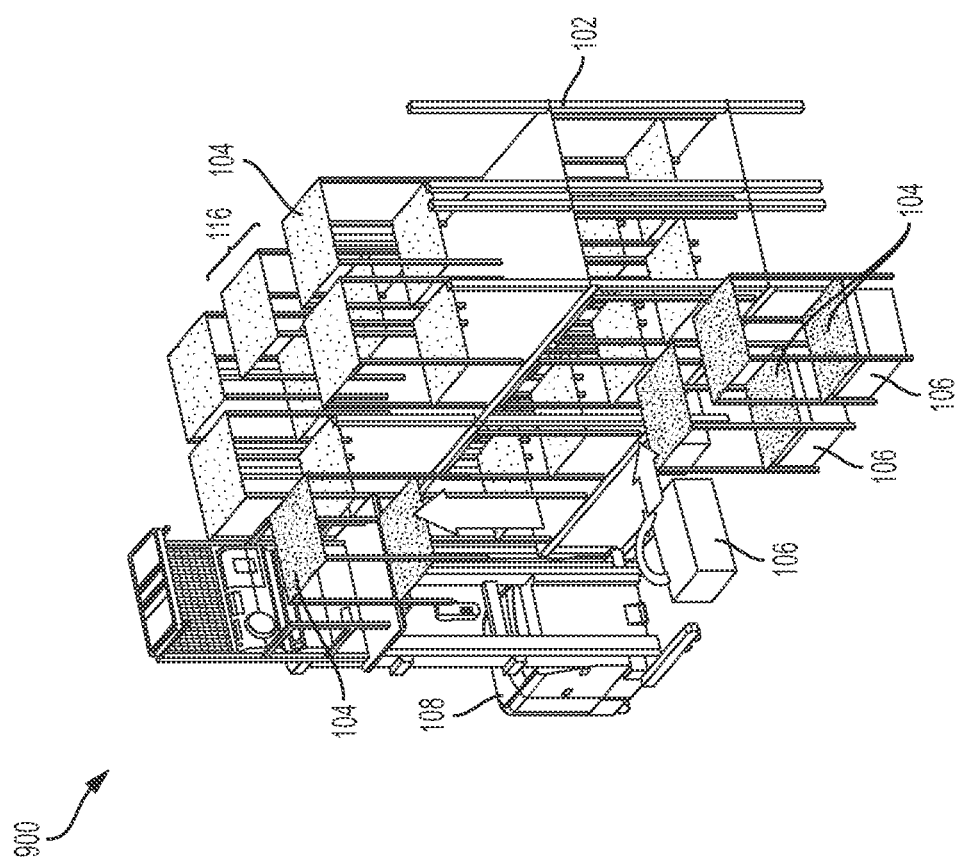
FIG. 9 depicts a pick-place vehicle raising a mobile storage unit above a mobile storage unit transfer node according to one or more embodiments shown and described herein.
Figure 10:
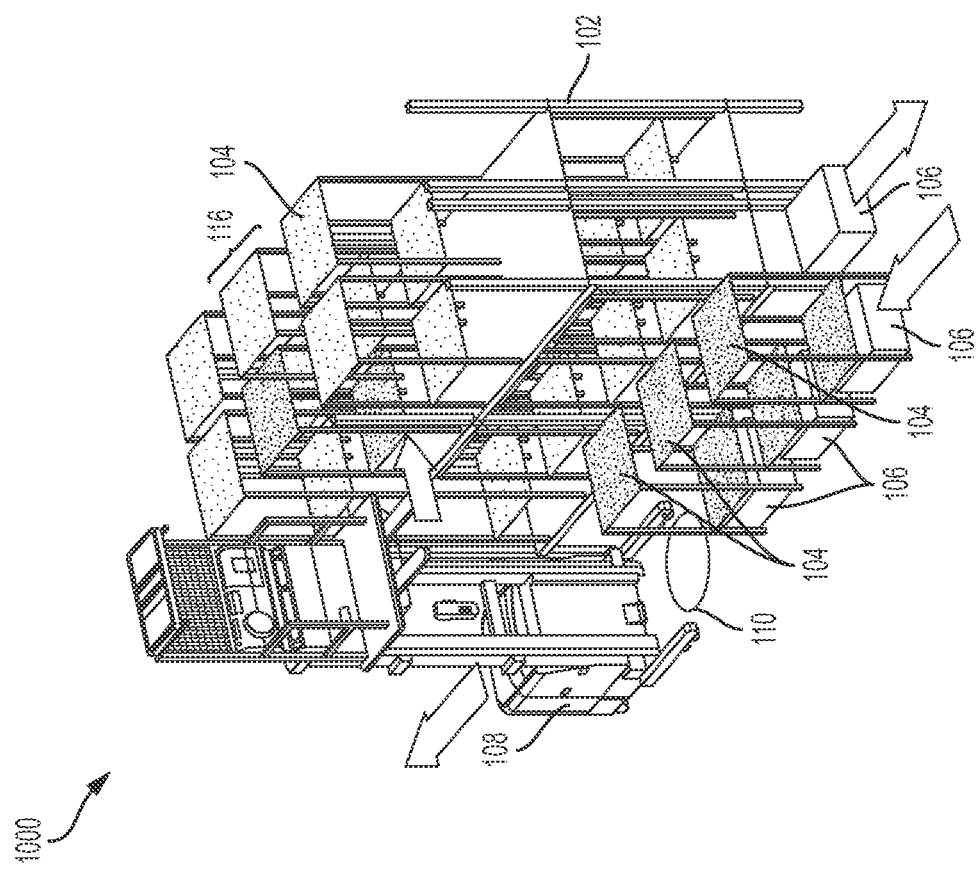
FIG. 10 depicts a pick-place vehicle placing a mobile storage unit within an upper level storage bay of a multilevel racking system according to one or more embodiments shown and described herein.

FIGS. 8, 9, and 10 present continuing depictions 800, 900, and 1000 of the pick operation in FIG. 7. Turning to FIG. 8, the first storage unit transporter 106 carries the mobile storage unit 104 to the assigned mobile storage unit transfer node 110 in front of the pick-place vehicle 108.

Turning to FIG. 9, the pick-place vehicle 108 lifts the mobile storage unit 104 from the mobile storage unit transfer node 110 up to a height corresponding to the partially stocked storage bay 116 in which the mobile storage unit 104 will be placed. The pick-place vehicle 108 can also place mobile storage units in unstocked storage bays 116. The first storage unit transporter 106 rotates and moves out of the aisle towards the multilevel racking system 102.

Turning to FIG. 10, having placed the mobile storage unit 104 into the storage bay 116, the pick-place vehicle 108 moves down the aisle 118 away from the mobile storage unit transfer node 110. The first storage unit transporter 106 travels under the first level of the lower level of storage bays 116 of the multilevel racking system 102 in a suitable direction. More storage unit transporters 106, each carrying a mobile storage unit 104, move in the aisle 118 in a suitable direction. In some embodiments, storage unit transporters 106 follow the pick-place vehicle 108 like a train moving down the aisle 118.

Figure 11:
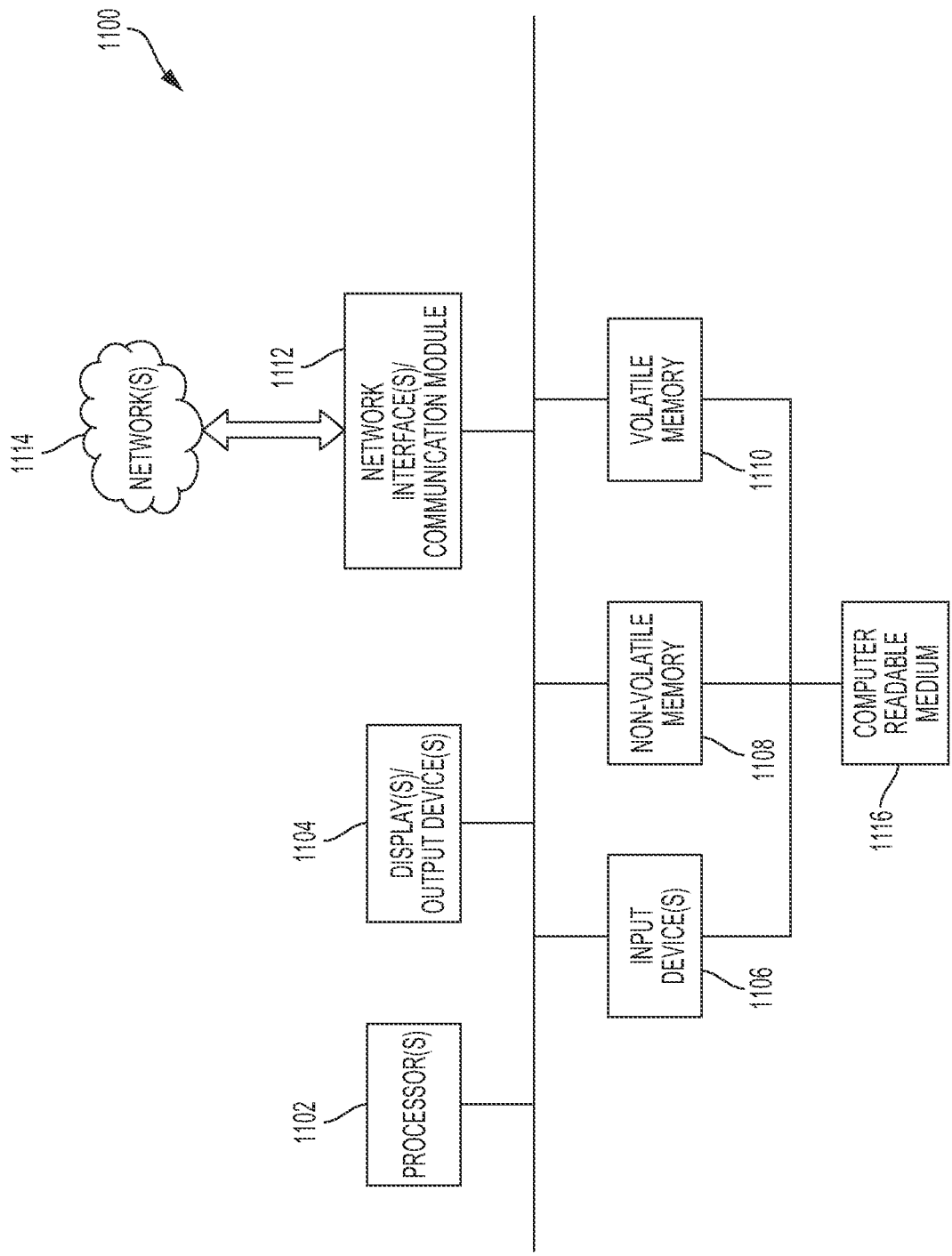
FIG. 11 depicts a computing device embodied in a warehouse management computing hub according to one or more embodiments shown and described herein.

Turning to FIG. 11, a block diagram illustrates an example of a computing device 1100, through which embodiments of the disclosure can be implemented, for example in a warehouse management computing hub 114. The computing device 1100 described herein is but one example of a suitable computing device and does not suggest any limitation on the scope of any embodiments presented. Nothing illustrated or described with respect to the computing device 1100 should be interpreted as being required or as creating any type of dependency with respect to any element or plurality of elements. In various embodiments, a computing device 1100 may include, but need not be limited to, a desktop, laptop, server, client, tablet, smartphone, or any other type of device that can compress data. In an embodiment, the computing device 1100 includes at least one processor 1102 and memory (non-volatile memory 1108 and/or volatile memory 1110). The computing device 1100 can include one or more displays and/or output devices 1104 such as monitors, speakers, headphones, projectors, wearable-displays, holographic displays, and/or printers, for example. The computing device 1100 may further include one or more input devices 1106 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 1100 may include non-volatile memory 1108 (ROM, flash memory, etc.), volatile memory 1110 (RAM, etc.), or a combination thereof. A network interface 1112 can facilitate communications over a network 1114 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 1112 can be communicatively coupled to any device capable of transmitting and/or receiving data via the network 1114. Accordingly, the hardware of the network interface 1112 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 1116 may comprise a plurality of computer readable mediums, each of which may be either a computer readable storage medium or a computer readable signal medium. A computer readable storage medium 1116 may reside, for example, within an input device 1106, non-volatile memory 1108, volatile memory 1110, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 1100 may include one or more network interfaces 1112 to facilitate communication with one or more remote devices 1118, which may include, for example, client and/or server devices. A network interface 1112 may also be described as a communications module, as these terms may be used interchangeably.

It is also noted that recitations herein of "at least one" or "one or more" components, elements, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A goods-to-man warehousing system comprising:
   a multilevel racking system;
   a plurality of mobile storage units;
   a storage unit transporter; and
   a pick-place vehicle, wherein
      each mobile storage unit comprises a plurality of vertically aligned shelves,
      the multilevel racking system comprises a vertically and horizontally distributed array of storage bays,
      the storage unit transporter and the pick-place vehicle are each configured to travel along a warehouse floor upon which the multilevel racking system is supported,
      the storage unit transporter is further configured to travel beneath the vertically and horizontally distributed array of storage bays of the multilevel racking system,
      the pick-place vehicle comprises pick-place hardware that enables the pick-place vehicle to place one of the mobile storage units into one of the storage bays of the multilevel racking system, and
      the storage unit transporter comprises storage unit engagement hardware that enables the storage unit transporter to receive the mobile storage unit from the storage bay such that the mobile storage unit is placed atop the storage unit transporter and transport the mobile storage unit away from the storage bay with the mobile storage unit placed atop the storage unit transporter.

2. The goods-to-man warehousing system as claimed in claim 1, wherein the storage bays of the multilevel racking system comprise respective storage bay heights that are limited to accommodate a height of only one mobile storage unit.

3. The goods-to-man warehousing system as claimed in claim 1, wherein a warehouse management computing hub communicates with the pick-place vehicle to place the mobile storage unit in a selected storage bay based at least partially on a utilization frequency associated with the mobile storage unit.

4. The goods-to-man warehousing system as claimed in claim 3, wherein the goods-to-man warehousing system is configured to designate higher velocity storage bays for target mobile storage units with utilization frequencies exceeding utilization frequencies of low velocity storage bays for target mobile storage units.

5. The goods-to-man warehousing system as claimed in claim 1, wherein
   the pick-place vehicle comprises lifting forks mounted to a pivoting mast; and
   the lifting forks are structurally configured to engage and disengage the mobile storage units.

6. The goods-to-man warehousing system as claimed in claim 1, wherein the pick-place vehicle is configured to:
   engage the mobile storage unit with a lifting mechanism; and
   place the target mobile storage unit into a vertically displaced unstocked or partially stocked storage bay using the lifting mechanism of the pick-place vehicle.

* * * * *